(12) United States Patent
Nishikawa (10) Patent No.: US 7,697,177 B2
(45) Date of Patent: Apr. 13, 2010

(54) IMAGE PROCESSING METHOD, APPARATUS AND PROGRAM PRODUCT

(75) Inventor: Hiromitsu Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 940 days.

(21) Appl. No.: 11/286,434

(22) Filed: Nov. 25, 2005

(65) Prior Publication Data

US 2006/0115147 A1 Jun. 1, 2006

(30) Foreign Application Priority Data

Nov. 30, 2004 (JP) .............................. 2004-346343

(51) Int. Cl.
*G03F 3/08* (2006.01)
*G09G 5/02* (2006.01)
(52) U.S. Cl. .................. 358/523; 358/518; 345/604
(58) Field of Classification Search ............... 358/1.9, 358/535, 3.23, 520, 518, 523; 382/164, 162, 382/167; 345/427, 589, 590, 604; 347/15, 347/41, 43; 399/45, 67, 325; *G03F 3/08; G09G 5/02; H04N 1/00, 1/40; G06F 15/00*
See application file for complete search history.

(56) References Cited

U.S. PATENT DOCUMENTS

| | | | | |
|---|---|---|---|---|
| 5,508,827 A | * | 4/1996 | Po-Chieh | 358/518 |
| 5,650,942 A | * | 7/1997 | Granger | 358/500 |
| 6,088,546 A | * | 7/2000 | Inoue et al. | 399/45 |
| 6,118,550 A | * | 9/2000 | Hayashi | 358/296 |
| 6,223,005 B1 | * | 4/2001 | Rush et al. | 399/45 |
| 6,560,351 B1 | * | 5/2003 | Hirota | 382/108 |
| 6,749,284 B2 | * | 6/2004 | Nagoshi et al. | 347/43 |
| 6,923,523 B2 | | 8/2005 | Nishikawa et al. | 347/43 |
| 7,034,959 B1 | * | 4/2006 | Takemoto | 358/1.9 |
| 2003/0099007 A1 | * | 5/2003 | Towner et al. | 358/520 |
| 2004/0070777 A1 | | 4/2004 | Nishikawa et al. | 358/1.9 |
| 2005/0031379 A1 | * | 2/2005 | Toyohara | 399/223 |

FOREIGN PATENT DOCUMENTS

| | | |
|---|---|---|
| JP | 6-242523 | 9/1994 |
| JP | 7-266614 | 10/1995 |
| JP | 2005288802 A * | 10/2005 |

\* cited by examiner

*Primary Examiner*—James A Thompson
(74) *Attorney, Agent, or Firm*—Fitzpatrick, Cella, Harper & Scinto (57) ABSTRACT

A coloring material color separating section 101 separates an input image into ink colors of a printer referring to an LUT which is registered in the printer as initial values and used for color separation of coloring materials. A total coloring material amount calculating section 102 calculates total amounts of coloring materials equal to amounts of component coloring materials to be used of each pixel from the data passing through the ink color separation, and obtains the maximum value of them. A total coloring material amount adjusting section 103 readjusts the total amounts of the coloring materials of all the pixels such that they become equal to the maximum amount of the coloring materials using the total amount of the coloring materials of the pixel at which the total amount of the coloring material becomes maximum.

12 Claims, 8 Drawing Sheets

IMAGE PROCESSING METHOD, APPARATUS AND PROGRAM PRODUCT

BACKGROUND OF THE INVENTION

1. Field of the Invention

The present invention relates to an image processing method, apparatus and program, and more particularly to an image processing method, apparatus and program for reproducing target colors by combining a plurality of coloring materials and a transparent material.

2. Description of Related Art

Generally, to make color prints by printing or with a variety of printers, four coloring materials of Y (yellow), M (magenta), C (cyan) and K (black) are often used. A lot of lookup table (LUT) makeup methods have been proposed for representing, by coloring material colors, images which are generated by reproducing target colors by combining the four-color coloring materials from RGB color image data input from a scanner or acquired as the data. Likewise, a number of matrix calculating methods have been proposed.

For example, a method is proposed which determines by calculation the amount of the K (black) component to be used, one of the four coloring material components Y (yellow), M (magenta), C (cyan) and K (black), first, and then determines the amounts of the remaining three coloring materials, Y (yellow), M (magenta) and C (cyan) components, to be used (for example, see, Japanese patent application laid-open No. 6-242523 (1994)).

Although the method can achieve the target colors, it does not consider the amount of coloring materials used, which remain on a surface of a recording medium. In particular, when the pigment coloring materials are used, they have a characteristic that the coloring materials remain on printing paper in contrast to dye coloring materials. This results in unevenness of the total amounts of the coloring materials, the sum totals of the amounts of the coloring material components to be used, on the recording medium, thereby bringing about roughness on the printed surface. Such roughness on the surface has a problem of deteriorating the print image as a result of diffuse reflection of light on the surface. To counteract such a problem, a method is proposed which uses transparent toner for controlling glossiness of the image (for example, see, Japanese patent application laid-open No. 7-266614 (1995)).

However, an image processing method or an image processing apparatus has not been studied which limits the diffuse reflection of light in a thick-and-thin system using a thick-and-thin recording mediums. In addition, glossiness meeting user requirements has not been implemented.

The present invention is implemented to solve the foregoing problems. It is therefore an object of the present invention to provide an image processing method, apparatus and program capable of improving the image quality by suppressing the diffuse reflection of light in a thick-and-thin system. Another object of the present invention is to provide an image processing method and image processing apparatus capable of achieving the glossiness meeting the user requirements.

SUMMARY OF THE INVENTION

The present invention aims to solve the foregoing problems. The image processing apparatus in accordance with the present invention comprises: color conversion means for converting individual color components of input image data into components of a plurality of coloring materials for generating an image, and for outputting output image data represented for each of the components of the plurality of coloring materials; component coloring material used amount calculating means for calculating, for each of pixels of the output image data, amounts of component coloring materials to be used, which are a sum total of amounts of each of the components of the plurality of coloring materials to be used, which are subjected to the conversion; and adjusting control means for outputting adjusted image data by determining, for each of the pixels, a target amount of coloring materials to be used according to the amounts of component coloring materials to be used, and by adjusting an amount to be used for each component of the plurality of coloring materials such that the amounts of component coloring materials to be used become equal to the target amount of coloring materials to be used for each of the pixels in the output image data.

The image processing method in accordance with the present invention comprises a color conversion step for converting individual color components of input image data into components of a plurality of coloring materials for generating an image, and for outputting output image data represented for each of the components of the plurality of coloring materials; a component coloring material used amount calculating step for calculating, for each of pixels of the output image data, amounts of component coloring materials to be used, which are a sum total of amounts of each of the components of the plurality of coloring materials to be used, which are subjected to the conversion; and an adjusting control step for outputting adjusted image data by determining, for each of the pixels, a target amount of coloring materials to be used according to the amounts of component coloring materials to be used, and by adjusting an amount to be used for each component of the plurality of coloring materials such that the amounts of component coloring materials to be used become equal to the target amount of coloring materials to be used for each of the pixels in the output image data. It is also possible to cause a program to execute the method, and to store the program in a computer readable medium.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

The invention will now be described with reference to the accompanying drawings.

Embodiment 1

Figure 1:
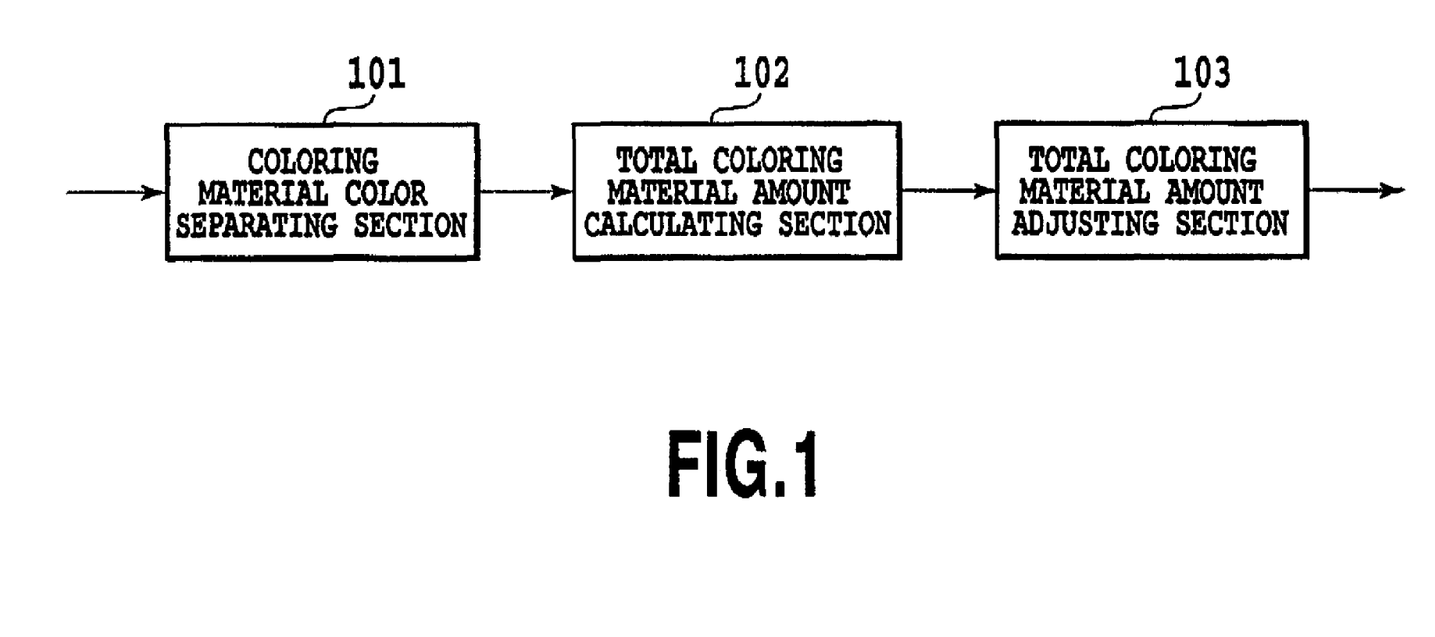
FIG. 1 is a block diagram showing a configuration of a color separation image processing system of an embodiment in accordance with the present invention.

FIG. 1 is a block diagram showing an entire configuration of a color separation system of a color printer which is an image generating apparatus of an embodiment in accordance with the present invention. As shown in FIG. 1, the color separation system of the color printer of the present embodiment uses an LUT (lookup table) for the color separation of the coloring materials registered in the printer as initial values. A coloring material color separating section 101 has a color conversion means for carrying out color separation of an input image in accordance with the ink colors of the printer using the LUT. In addition, the system includes a total coloring material amount calculating section 102 (component coloring material used amount calculating means) for calculating total amounts of coloring materials equal to amounts of component coloring materials used for individual pixels from the data passing through the ink color separation by the coloring material color separating section 101, and for obtaining the maximum value of the total amounts. Furthermore, the system obtains the total amount of the coloring materials of the pixel that has the maximum total amount of the coloring materials from the total amounts of the coloring materials of all the pixels calculated by the total coloring material amount calculating section 102. Moreover, the system has a total coloring material amount adjusting section 103 (adjusting control means) for carrying out readjustment in such a manner that the total amounts of the coloring materials of all the pixels become equal to the maximum amount of the coloring materials by using the total amounts of the coloring materials obtained.

Figure 2:
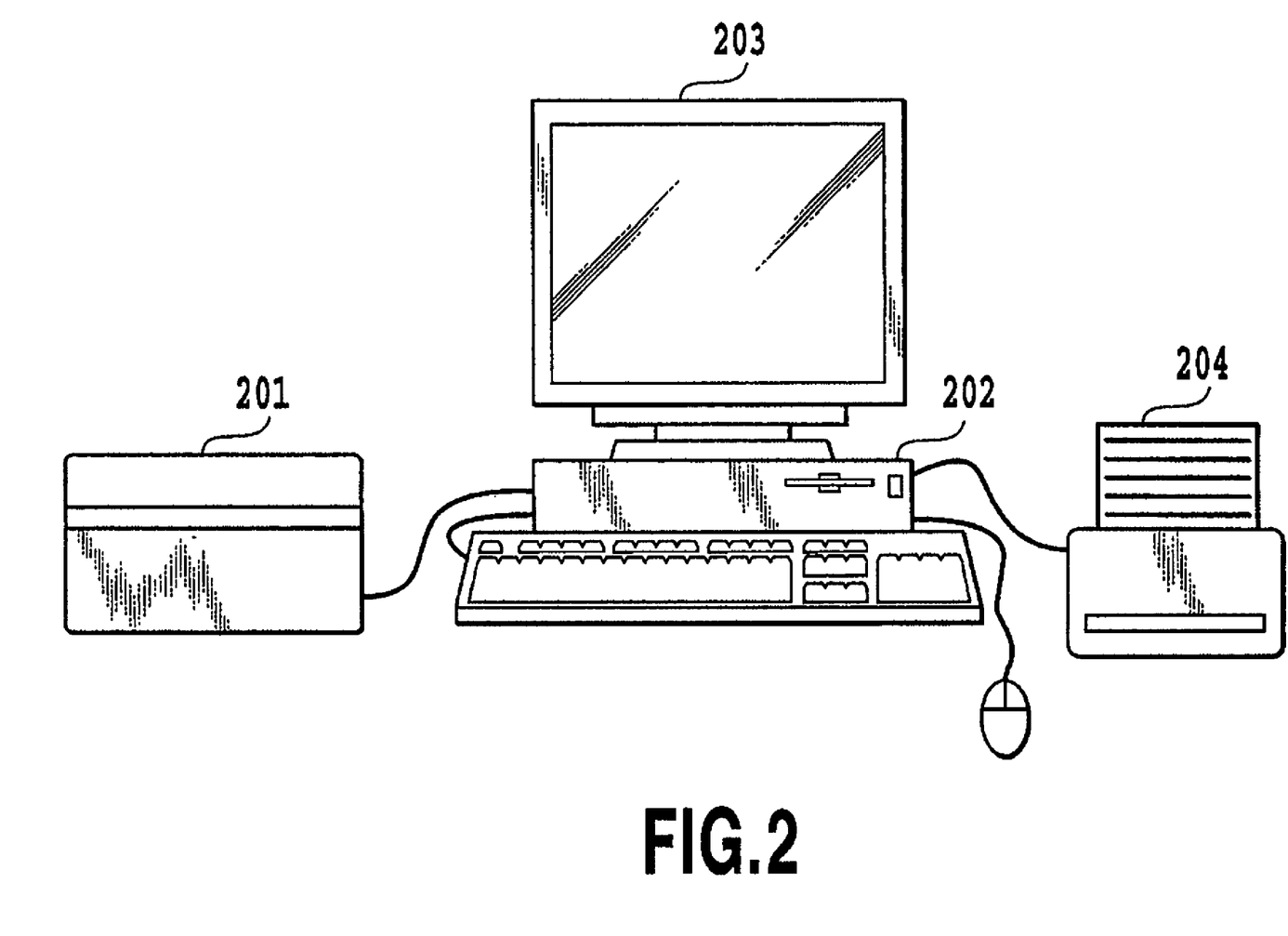
FIG. 2 is a view showing part of the color separation image processing system of the embodiment in accordance with the present invention.

FIG. 2 shows a color separation image processing system of the present embodiment. In FIG. 2, a personal computer 202 as a computer system, which receives an image signal read by a spectrophotometer 201 operating as an image signal input unit, can edit and keep the image signal. In addition, the personal computer 202 can cause a display 203 to display the image signal obtained, or a printer 204 to output it.

Figure 3:
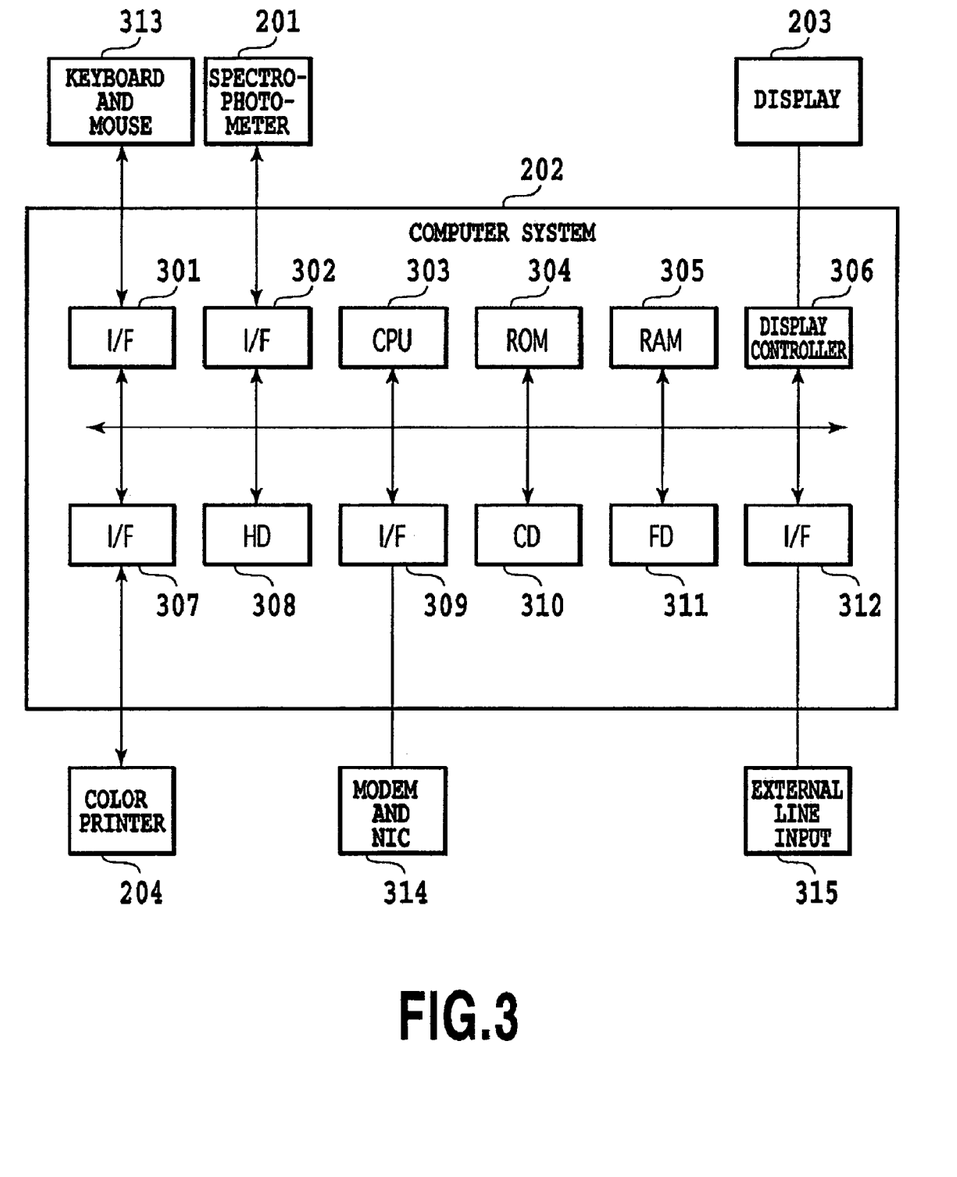
FIG. 3 is a block diagram showing individual modules of the color separation image processing system of the embodiment in accordance with the present invention.

FIG. 3 is a block diagram showing a major portion of the configuration of FIG. 2 in blocks of functional modules. In FIG. 3, an interface (I/F) 301 connects to the computer system 202 a mouse and keyboard 313 provided for a user to input manual instructions and the like. An interface (I/F) 302 connects the computer system 202 with image input equipment such as the spectrophotometer 201.

A CPU 303 controls operations of individual internal blocks, or executes programs stored inside the system. A ROM 304 stores image processing programs and the like that are necessary in advance. A RAM 305 temporarily stores programs and image data to be processed for the processing by the CPU 303. A display control unit 306 controls the display unit 203 for displaying an image to be processed and a message to an operator. An interface (I/F) 307 connects the computer system 202 with a color printer 204.

A hard disk (HD) 308 can store programs and image data to be transferred to the RAM 305 and the like, and store the image data after processing. An interface (I/F) 309 connects, to the computer system, transmission equipment 314 such as a modem or network card capable of transmitting a variety of data kept by various sections of the computer system to external equipment, and of receiving a variety of data from the external equipment. A CD drive 310 reads data stored in a CD (including a CD-R/CD-RW/DVD), one of external storing mediums, and writes data to it.

Likewise, an FD drive 311 reads from or writes to an FD. When an image editing program or printer information is stored in the CD, FD or DVD, they are installed on the HD 308, and transferred to the RAM 305 as needed. A sound interface (I/F) 312 connects the computer system with an external line input 315 or a microphone for inputting speech data from outside.

Figure 4:
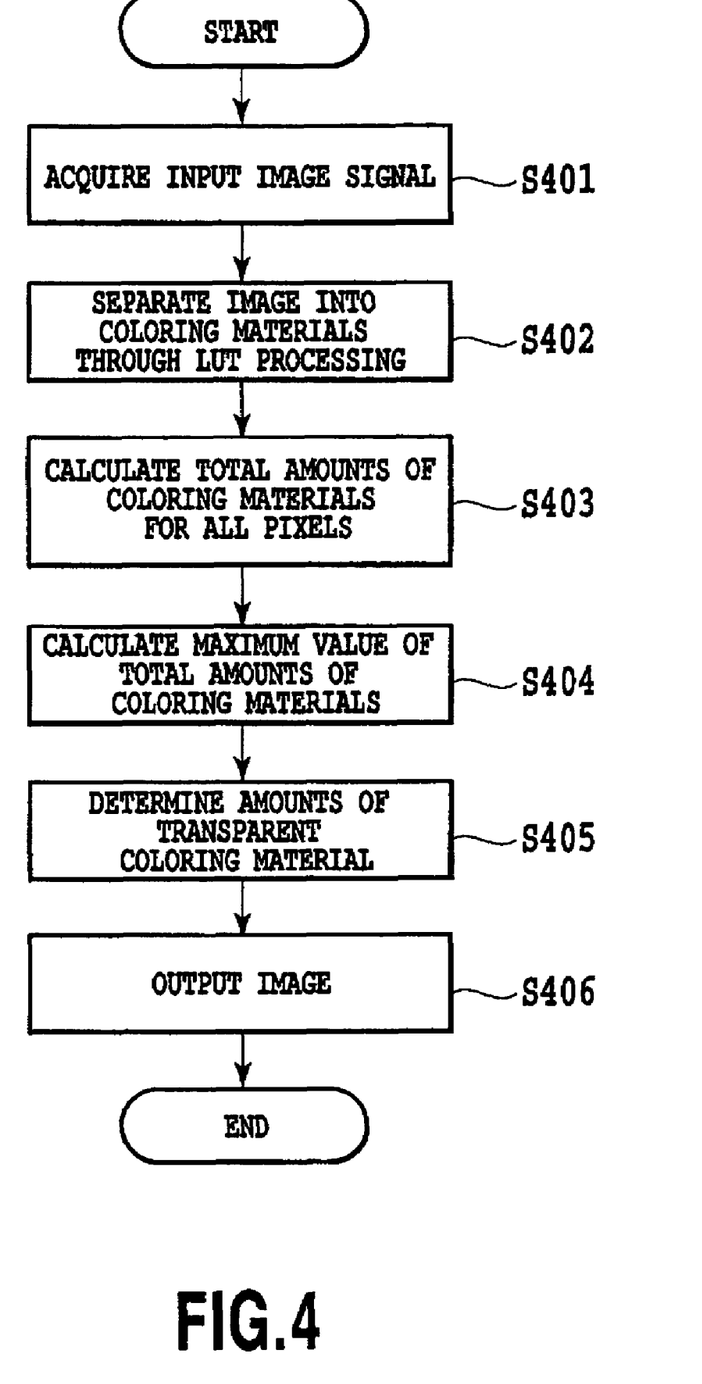
FIG. 4 is a flowchart illustrating the operation of the color separation image processing in a first embodiment in accordance with the present invention.

FIG. 4 is a flowchart illustrating an operation procedure for describing the present embodiment on the configuration as shown in FIGS. 2 and 3. A computer-executable program describing the procedure of the flowchart of FIG. 4 is stored in the ROM 304 in advance, or the program which is stored in an external storing unit 308 in advance is read out and written to the RAM 305. Subsequently, the CPU 303 executes the program, thereby carrying out the present embodiment. The flow of the processing in the present embodiment will now be described with reference to the flowchart illustrated in FIG. 4.

First, at step S401, the input image signal is acquired. The input image signal is input using the spectrophotometer 201 shown in FIG. 3, or using a color image scanner or the like (not shown) which is connected with the image input equipment via the connecting I/O 302. Besides, the input image signal can be input from the external storing unit 308, CD drive 310 or FD drive 311. Here, the image signal refers to information items for the basic color components R (red), G (green) and B (blue), or $L^*a^*b^*$. The input image signal or the input image data supplied is stored in the RAM 305 for the subsequent processing.

Next, at step S402, a combination of coloring material signals (such as C (cyan), M (magenta), Y (yellow) and BK (black)) for each input image signal is calculated by the LUT processing using an appropriate interpolation method such as a tetrahedral interpolation and cubic interpolation. After completing step S402, the processing proceeds to the next step S403. At step S403, as to the combinations of all the coloring material signals calculated at step S402, the total amount of coloring materials to be used is calculated for each of all the pixels. The calculated results are stored in the RAM 305, or stored using the external storing unit 308 when the data amount is large.

Subsequently, at step S404, the maximum value of the total amounts of coloring materials to be used of all the pixels calculated is determined at step S403. The result determined is stored in the RAM 305. At step S405, for each of all the pixels, the amount of a transparent coloring material to be used is determined so that the sum of the total amount of coloring materials to be used and the amount of the transparent coloring material to be used becomes equal to the target total amount of the coloring materials which is equal to the target amount of coloring materials to be used determined at step S404.

At step S406, the combination of the coloring material signals obtained at step S402 and the amounts of the transparent coloring material to be used obtained at step S405 are output via the RAM 305, and the CPU 303 issues a printing command to the printer 204. A series of operations ends when step S406 is completed. Although the present embodiment determines the amounts of the transparent coloring material such that all the pixels of the input image have the target amount of the coloring materials, this is not essential. For example, the processing can be executed not for all the pixels of the input image, but for all the pixels within an object including the pixels to be processed (for example, when the pixels of an image object are pixels to be processed, the processing is carried out for all the pixels within the image object).

As described above, the present embodiment can make uniform the total amounts of the coloring materials on the surface of the recording medium, and improve the image quality by suppressing the diffuse reflection of light.

Second Embodiment

Figure 5:
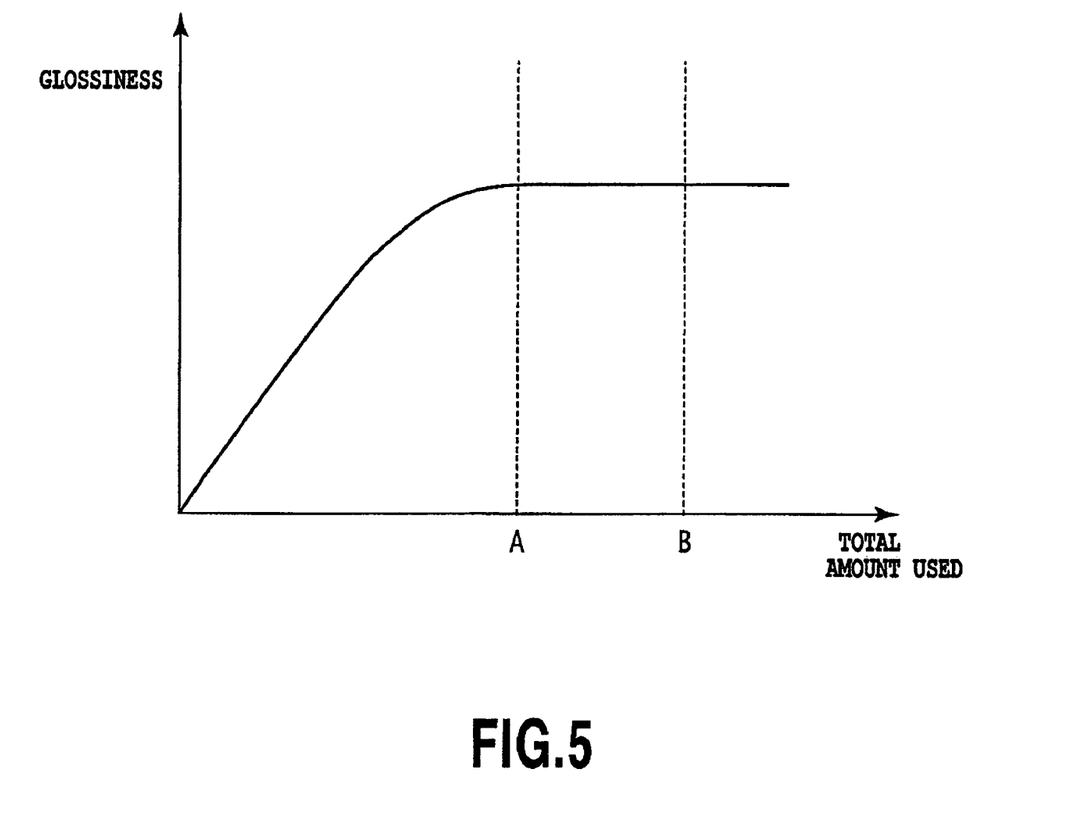
FIG. 5 is a graph illustrating the total amount used and glossiness in the embodiment in accordance with the present invention.

The foregoing first embodiment determines the amounts of transparent coloring material to be used at step S405 by calculating the difference between the target total amount of the coloring materials calculated at step S404 and the total amounts of the coloring materials used in the individual pixels calculated at step S403. The present embodiment, however, proposes another method which determines the amounts of transparent coloring material to be used calculated at step S405 in such a manner that they become equal to the total amounts used which will provide the glossiness equivalent to the glossiness achieved by the target total amount of the coloring materials. Referring to FIG. 5, the present embodiment will be described below.

Figure 6:
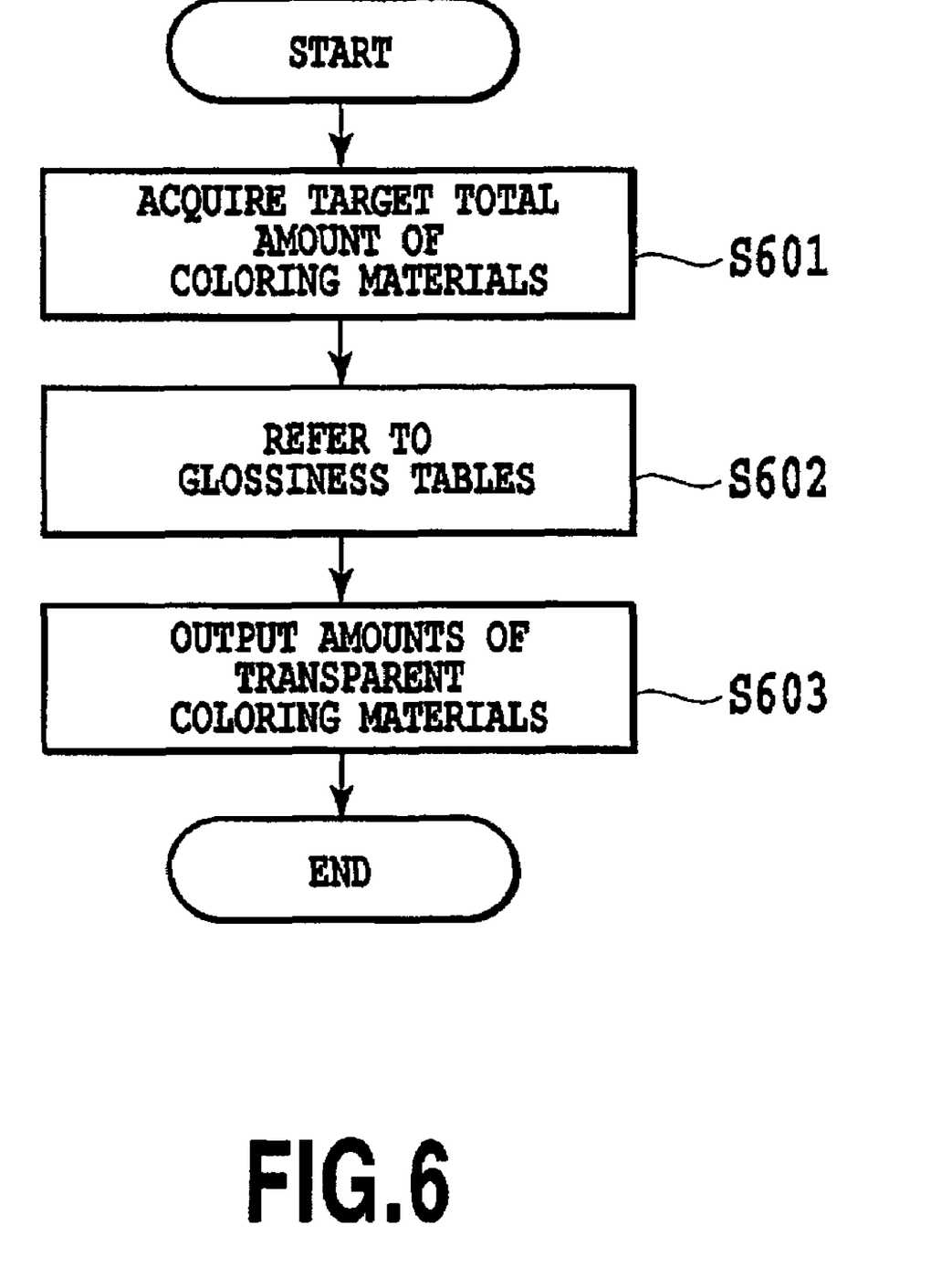
FIG. 6 is a flowchart illustrating the operation of the color separation image processing in a second embodiment in accordance with the present invention.

In electrophotography and the like, because of the process characteristics of fusing, the total amount used and the glossiness do not always have a linear relationship as illustrated in FIG. 5. As shown in FIG. 5, although the total amounts used differ at points A and B, the glossiness at these points is equal. In such a case, the processing at step S405 can be executed by a method different from the method described in the first embodiment. An example of such processing is shown in the flowchart of FIG. 6. The flow of the processing will be described with reference to FIG. 6. At step S601, the target total amount of the coloring materials calculated at step S404 is computed.

At the next step S602, referring to the relationships between the glossiness and the total amount used as illustrated in FIG. 5, if the target total amount of the coloring materials is at the point B, the point A at which the glossiness is equivalent and the total amount used is minimum is set as a new target total amount of the coloring materials. The calculation results are stored in the RAM 305. Finally, at step S603, the amounts of transparent coloring material to be used are calculated from the differences between the new target total amount of the coloring materials set at step S602 and the total amounts of coloring materials to be used calculated at step S403. After completing step S603, the processing returns to step S405 to terminate.

As described above, the present embodiment can control the glossiness without using unnecessary coloring materials. Thus, the present embodiment can control the amounts of the coloring materials to be used efficiently.

Third Embodiment

Figure 7:
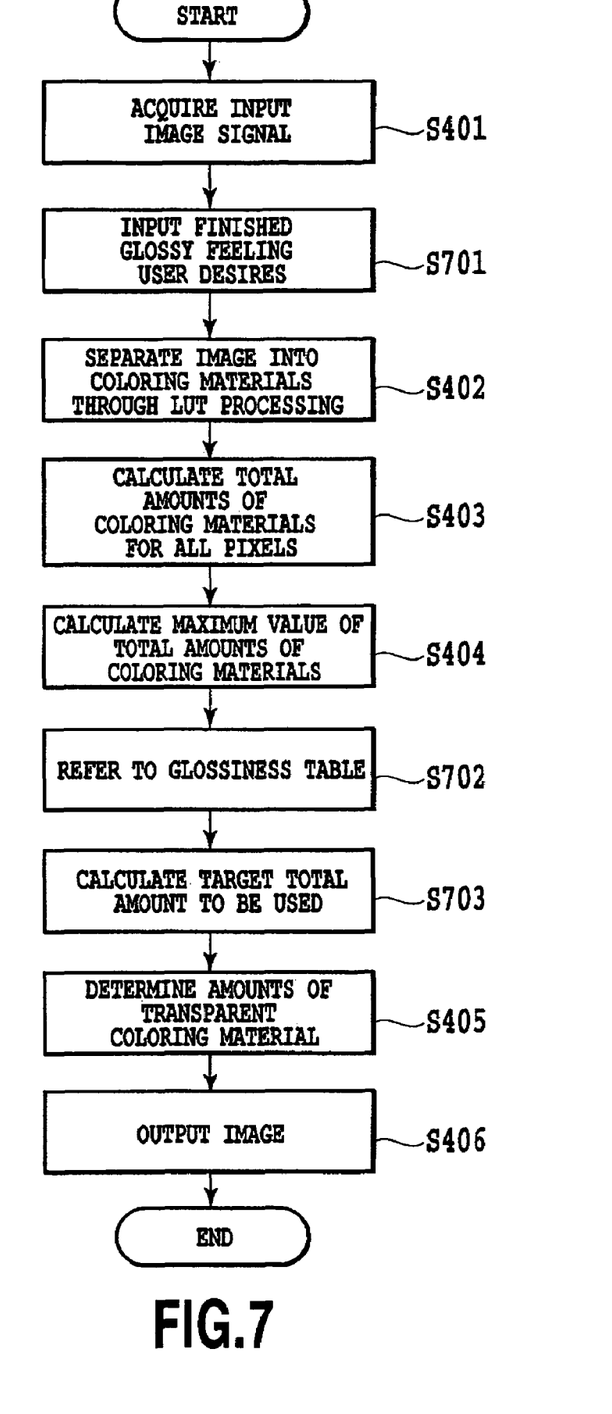
FIG. 7 is a flowchart illustrating the operation of the color separation image processing in a third embodiment in accordance with the present invention.

FIG. 7 is a flowchart illustrating an operation procedure for implementing another embodiment in accordance with the present invention on the apparatus with the configuration as shown in FIGS. 2 and 3. A computer-executable program describing the procedure as illustrated in the flowchart of FIG. 7 is stored in the ROM 304 in advance. Alternatively, the program stored in the external storing unit 308 in advance is read and written on the RAM 305 so that the CPU 303 executes the program to implement the present invention.

The flow of the processing in the present embodiment will be described with reference to the flowchart shown in FIG. 7. The same steps as those of the first embodiment described with reference to FIG. 4 are designated by the same reference symbols, and different steps are designated by different reference symbols. First, at step S401, the input image signal is acquired as in the first embodiment.

Figure 8:
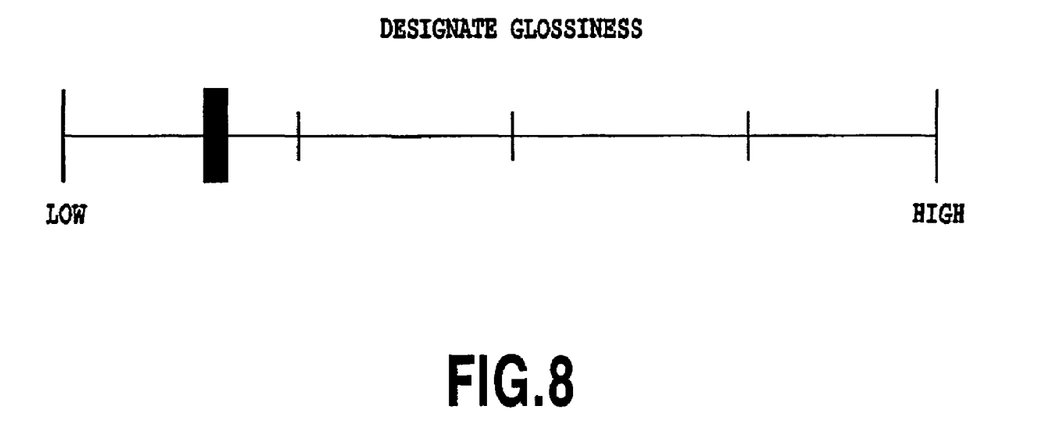
FIG. 8 is a diagram illustrating a glossiness designation UI in the embodiment in accordance with the present invention.

At the next step S701, a user who inputs the image designates a desired glossiness using a specified glossiness input means. The user designates it using a slider bar UI (user interface) displayed on the display unit 203 as shown in FIG. 8, for example. This designation is carried out with the mouse and keyboard 313. At the next steps S402-S404, the same processing as that of the first embodiment is carried out. Incidentally, the UI is implemented by the printer driver of the color printer 204 for processing the input image signal.

At step S702, as for the maximum total amount of the coloring materials set at step S404, the glossiness implemented by the maximum amount of the coloring materials is referred to in the relationships between the total amount used and glossiness as illustrated in FIG. 5, and the result is stored in the RAM 305.

At the next step S703, a comparison is made between the glossiness referred to at step S702 and the glossiness desired by the user and input at step S701. If the glossiness stored in the RAM 305 is lower than the glossiness designated by the user, the target total amount used is derived so as to achieve the desired glossiness, and the target total amount used is stored in the RAM 305 for the subsequent processing. In contrast, if the glossiness stored in the RAM 305 is higher than the glossiness desired by the user, one of the following two methods is applied. (1) When using a thick-and-thin ink system (using light inks (light cyan and light magenta) in addition to dark inks (cyan, magenta, yellow and black), the amount of coloring materials to be used is reduced by replacing the light inks by the dark inks. In other words, by using the dark inks capable of reproducing the same density as the light inks, an equivalent reproduction is achieved by smaller amounts of dark inks than when using the light inks (here, the dark cyan ink refers to an ink that has the same hue as the light cyan ink, but has a different density). As a result, it becomes possible to reduce the amount of inks used for reproducing the pixels to be processed, and hence to reduce the glossiness. (2) A new LUT, which makes the total amount of the coloring materials used equal to the present target total amount used, is selected from the LUTs stored in the driver (that is, select a new LUT which can reproduce an image using smaller amounts of dark inks instead of reducing the light inks as a result of separating the inks in advance). Alternatively, the LUT is obtained from the memory on the external storing unit 308, CD drive 310 or FD drive 311; or via a modem capable of receiving a variety of data from the external equipment or via the transmission equipment 314 such as a network card. In this case also, the target total amount used is derived and stored in the RAM 305 for the subsequent processing.

At step S405, for each of all the pixels, the amount of the transparent coloring material to be used is determined so that the sum of the total amount of coloring materials to be used and the amount of the transparent coloring material to be used becomes equal to the target total amount of the coloring materials, which is set at step S703. More specifically, if the glossiness stored in the RAM 305 is lower than the glossiness desired by the user, the transparent coloring material is used to increase the glossiness. At step S406, the combination of the coloring material signals obtained at step S701 or the combination of the coloring material signals set again at step S703, and the amounts of the transparent coloring material to be used obtained at step S405 are output via the RAM 305. The CPU 303 issues a printing command to the printer 204. As a result, an image is generated using the combination of the coloring material signals obtained at step S701 or the combination of the coloring material signals set again at step S703, and the amounts of the transparent coloring material to be used obtained at step S405. A series of processings ends when step S406 is completed. As described above, using both the thick-and-thin ink system and transparent coloring material enables highly flexible glossiness control. It is obvious that using a thick-and-thin toner system instead of the thick-and-thin ink system can also offer the same advantages with the same configuration.

Although the present embodiment determines the amounts of the transparent coloring material such that all the pixels of the input image have the target amount of the coloring materials, this is not essential. For example, the processing can be executed not for all the pixels of the input image, but for all the pixels within an object including the pixels to be processed (for example, when the pixels of an image object are pixels to be processed, the processing is carried out for all the pixels within the image object).

As described above, according to the present embodiment, the user can designate the glossiness, and efficient control becomes possible of the amounts of the coloring materials to be used according to the designation.

Fourth Embodiment

In the foregoing first and third embodiments, although the calculation of the combination of the ink amounts carried out at step S402 is made from the LUT (lookup table), the present invention is not limited to this. For example, the present embodiment is configured in such a manner that it calculates the amounts of the coloring materials by carrying out the matrix processing as described before, and the remaining operation is the same as that of the first and third embodiment.

As described above, the present embodiment offers advantages resulting from utilizing the matrix processing. In addition, the present embodiment can make uniform the total amounts of the coloring materials on the surface of the recording medium, and improve the image quality by suppressing the diffuse reflection of light.

Although a variety of embodiments are described above, the present invention is not limited to the apparatus and method for implementing the foregoing embodiments. It is also possible to provide the computer (CPU or MPU) in the foregoing system or apparatus with program code, the software, for implementing the foregoing embodiments. The present invention includes the cases in which the computer in the system or apparatus operates the foregoing devices according to the program code to implement the foregoing embodiments.

In this case, the program code itself of the software implements the functions of the foregoing embodiments. In this case, the present invention includes the program code itself and the means for supplying the program code to the computer, and more specifically, the storing medium storing the foregoing program code.

As the mediums for storing such program code, are used a floppy disk, hard disk, optical disk, magneto-optical disk, CD-ROM, magnetic tape, nonvolatile memory card and ROM.

In addition, when the functions of the foregoing embodiments are implemented by controlling the devices by the computer according to only the program code supplied, the program code falls within the scope of the present invention. Besides, when the foregoing embodiments are implemented by the program code in conjunction with the OS (operating system) or with other applications on the computer, the program code also falls within the scope of the present invention.

Furthermore, the program code supplied can be stored in a memory in a function extension board of the computer or in a function extension unit connected to the computer. Then, the CPU installed in the function extension board or in the function extension unit executes part or all of the actual processing according to the instructions of the program code to implement the foregoing embodiments by the processing, which case also falls within the scope of the present invention.

Moreover, a configuration including at least one of the foregoing features described above also falls within the scope of the present invention.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

This application claims priority from Japanese Patent Application No. 2004-346343 filed Nov. 30, 2004, which is hereby incorporated by reference herein.

What is claimed is:

1. An image processing apparatus comprising:
color conversion means for convening individual color components of input image data into components of a plurality of coloring materials for generating an image, and for outputting output image data represented for each of the components of the plurality of coloring materials;
component coloring material used amount calculating means for calculating, for each of pixels of the output image data, amounts of component coloring materials to be used, which are a sum total of amounts of each of the components of the plurality of coloring materials to be used, which are subjected to the conversion;
maximum component coloring material amount detecting means for detecting an amount of component coloring materials at the pixel of said pixels, where a maximum value of the amounts of component coloring materials is used; and
adjusting means for calculating a minimum value of the amounts of component coloring materials, which reproduces a same glossiness as the amount of component coloring materials detected by the maximum component coloring material amount detecting means reproduces referencing a glossiness table which represents relationships between the amounts of component coloring materials to be used and glossiness in the case where an image of the input image data is generated and for adjusting the amount to be used for each component of the plurality of coloring materials such that the amounts of component coloring materials to be used become the minimum.

2. The image processing apparatus as claimed in claim 1, wherein said color conversion means carries out the conversion of the input image data using a lookup table representing correspondence between a specified color system and another color system.

3. The image processing apparatus as claimed in claim 1, wherein said color conversion means carries out the conversion of the input image data using a matrix conversion.

4. The image processing apparatus as claimed in claim 1, wherein the components of the plurality of coloring materials includes yellow, magenta, and cyan.

5. The image processing apparatus as claimed in claim 4, wherein the components of the plurality of coloring materials further includes black.

6. An image processing method comprising:
- a color conversion step for converting individual color components of input image data into components of a plurality of coloring materials for generating an image, and for outputting output image data represented for each of the components of the plurality of coloring materials;
- a component coloring material used amount calculating step for calculating, for each of pixels of the output image data, amounts of component coloring materials to be used, which are a sum total of amounts of each of the components of the plurality of coloring materials to be used, which are subjected to the conversion;
- maximum component coloring material amount detecting step for detecting an amount of component coloring materials at the pixel of said pixels. where a maximum value of the amounts of component coloring materials is used; and
- adjusting step for calculating a minimum value of the amounts of component coloring materials, which reproduces a same glossiness as the amount of component coloring materials detected in the maximum component coloring material amount detecting step reproduces referencing a glossiness table which represents relationships between the amounts of component coloring materials to be used and glossiness in the case where an image of the input image data is generated and for adjusting the amount to be used for each component of the plurality of coloring materials such that the amounts of component coloring materials to be used become the minimum.

7. A computer-readable medium storing a computer-executable program, the program for causing a computer to execute the steps as defined in claim 6.

8. The image processing method as claimed in claim 6, wherein said color conversion step carries out the conversion of the input image data using a lookup table representing correspondence between a specified color system and another color system.

9. The image processing method as claimed in claim 6, wherein said color conversion step carries out the conversion of the input image data using a matrix conversion.

10. The image processing method as claimed in claim 6, wherein the components of the plurality of coloring materials includes yellow, magenta, and cyan.

11. The image processing method as claimed in claim 10, wherein the components of the plurality of coloring materials further includes black.

12. An image processing apparatus comprising:
- coloring material used amount calculating means for calculating, for each of pixels, an amount of coloring materials to be used, which are a sum total of amounts of coloring materials to be used;
- maximum component coloring material amount detecting means for detecting an amount of component coloring materials at the pixel of said pixels, where a maximum value of the amounts of component coloring materials is used; and
- adjusting means for calculating a minimum value of the amounts of component coloring materials, which reproduces a same glossiness as the amount of component coloring materials detected by the maximum component coloring material amount detecting means reproduces referencing a glossiness table which represents relationships between the amounts of component coloring materials to be used and glossiness in the case where an image of the input image data is generated and for adjusting the amount to be used for each component of the plurality of coloring materials such that the amounts of component coloring materials to be used become the minimum.

* * * * *